United States Patent
Shutov et al.

(10) Patent No.: US 11,053,380 B2
(45) Date of Patent: Jul. 6, 2021

(54) POLYOLEFIN COMPOSITION WITH IMPROVED SURFACE APPEARANCE

(71) Applicant: BOREALIS AG, Vienna (AT)

(72) Inventors: Pavel Shutov, Linz (AT); Susanne Kahlen, Linz (AT); Daniela Mileva, Linz (AT); Renate Eckmayr, Linz (AT); Claudia Kniesel, Linz (AT)

(73) Assignee: BOREALIS AG, Vienna (AT)

( * ) Notice: Subject to any disclaimer, the term of this patent is extended or adjusted under 35 U.S.C. 154(b) by 17 days.

(21) Appl. No.: 16/621,335

(22) PCT Filed: Jun. 26, 2018

(86) PCT No.: PCT/EP2018/067125
§ 371 (c)(1),
(2) Date: Dec. 11, 2019

(87) PCT Pub. No.: WO2019/002300
PCT Pub. Date: Jan. 3, 2019

(65) Prior Publication Data
US 2021/0139683 A1  May 13, 2021

(30) Foreign Application Priority Data
Jun. 30, 2017 (EP) .................................. 17179125

(51) Int. Cl.
*C08L 23/12* (2006.01)
*C08L 23/16* (2006.01)

(52) U.S. Cl.
CPC .............. *C08L 23/12* (2013.01); *C08L 23/16* (2013.01); *C08L 2205/025* (2013.01); *C08L 2205/035* (2013.01); *C08L 2207/02* (2013.01); *C08L 2314/02* (2013.01)

(58) Field of Classification Search
None
See application file for complete search history.

(56) References Cited

U.S. PATENT DOCUMENTS

| 2003/0040583 A1 | 2/2003 | Washiyama et al. |
| 2013/0281630 A1* | 10/2013 | Leskinen ................ C08F 10/06 525/240 |

FOREIGN PATENT DOCUMENTS

| EA | 022216 B1 | 11/2015 |
| EA | 022886 B1 | 3/2016 |
| EP | 0887379 B1 | 12/2004 |
| EP | 2610271 A1 | 7/2013 |
| EP | 2610272 A1 | 7/2013 |
| EP | 2610273 A1 | 2/2018 |
| RU | 2341543 C2 | 12/2008 |
| RU | 2470963 C2 | 12/2012 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2010/149529 A1 | 12/2010 |
| WO | 2012/007430 A1 | 1/2012 |
| WO | 2012/062734 A1 | 5/2012 |
| WO | 2014/083130 A1 | 6/2014 |
| WO | 2014083129 A1 | 6/2014 |
| WO | 2015/091810 A1 | 6/2015 |

OTHER PUBLICATIONS

Russian Search Report for Application No. 2020100105/04 dated Apr. 17, 2020.
Russian Office Action for Application No. 2020100105/04(000215) dated Apr. 17, 2020.
Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, 1128-1134.
H. N. Cheng, "13C NMR Analysis of Ethylene-Propylene Rubbers", Macromolecules 1984, 17, 1950-1955.
Extended European Search Report for Patent Application No. 17179125.4-1302, dated Dec. 15, 2017.
Zweifel, et al., "Plastics Additives Handbook", 6th Edition, Department of Materials, Institute of Polymers, 2009, pp. 1141-1190.
Singh et al., "Triad sequence determination of ethylene-propylene copolymers—application of quantitative 13C NMR", Polymer Testing 28 (2009) pp. 475-479.
Frank, et al., "GS-VIII : OP18 New Measurement Method for Appearance of Flow Marks or Tiger Stripes Defect for Improved Quantification and Analysis", pp. 25, Mar. 15, 2009.
Wang et al., "Structural Analysis of Ethylene/Propylene Copolymers Synthesized with a Constrained Geometry Catalyst", Macromolecules 2000, 33, pp. 1157-1162.
Zhou et al., "A new decoupling method for accurate quantification of polyethylene copolymer composition and triad sequence distribution with 13C NMR", Journal of Magnetic Resonance 187 (2007) pp. 225-233.

\* cited by examiner

*Primary Examiner* — Richard A Huhn
(74) *Attorney, Agent, or Firm* — Tarolli, Sundheim, Covell & Tummino LLP

(57) ABSTRACT

The present invention is directed to a heterophasic polypropylene composition (HECO1) and the use thereof to reduce the amount of flow marks of an injection moulded polyolefin composition. Further, the present invention is directed to a polyolefin composition (C) comprising a polyolefin (PO), said heterophasic polypropylene composition (HECO1) and optionally a filler as well as an article comprising said polyolefin composition (C).

15 Claims, No Drawings

POLYOLEFIN COMPOSITION WITH IMPROVED SURFACE APPEARANCE

The present invention is directed to a heterophasic polypropylene composition (HECO1) and the use thereof to reduce the amount of flow marks of an injection moulded polyolefin composition. Further, the present invention is directed to a polyolefin composition (C) comprising a polyolefin (PO), said heterophasic polypropylene composition (HECO1) and optionally a filler as well as an article comprising said polyolefin composition (C).

Heterophasic propylene copolymers are widely used for the preparation of injection moulded automotive parts. A very severe problem in injection moulded parts made from heterophasic propylene copolymers is the occurrence of flow marks, i.e. alternating glossy and matte areas often referred to as "tiger stripes". Tiger stripe formation is particularly pronounced on larger parts at longer flow distances and higher injection speeds. Tiger stripe formation is caused by flow instabilities during injection molding and is observed perpendicular to the flow direction. The molten resin flows stably at an early stage in the injection molding process, in which the flow front advances symmetrically inside the mould. However, beyond certain distance from the gate, the flow front of the melt begins to fluctuate across the flow direction whereupon the flow of the melt becomes unstable.

The cause of the tiger stripe induction may be related to internal pressure loss. Shear strain during the injection molding forces the dispersed phase to be orientated along the shear flow direction, and the degree of the orientation increases with increasing shear strain. Therefore, the morphological differences in the rubbery phase indicate that a different shear strain occurred in the tiger stripe, and the glossy part was exposed to the higher strain compared to the matte part. Tiger stripes are not only diminishing the visual quality of the final moulded-in-colour part, but also negatively impact paintability of the painted part, since paintability depends among other on surface roughness.

Accordingly, there is a need in the art for a polyolefin composition which can be subjected to injection moulding without the occurrence of flow marks.

Therefore, it is an object of the present invention to provide a polypropylene composition which reduces the amount of flow marks of injection moulded parts made from polyolefin compositions.

The finding of the present invention is that the amount of flow marks of injection moulded parts made from polyolefin compositions, in particular heterophasic polypropylene compositions can be reduced significantly by addition of a heterophasic system comprising a bimodal matrix.

Accordingly, the present invention is directed to a heterophasic polypropylene composition (HECO1), comprising
i) a matrix (M) comprising a first propylene polymer (PP1) and a second propylene polymer (PP2), and
ii) an elastomeric propylene copolymer (EPR) being a copolymer of propylene and/or a $C_4$ to $C_8$ α-olefin dispersed within the matrix (M),
wherein the ratio MFR(PP1)/MFR(PP2) is above 520, wherein MFR(PP1) is the melt flow rate MFR (230° C., 2.16 kg) in [g/10 min] determined according to ISO 1133 of the first propylene polymer (PP1) and MFR (PP2) is the melt flow rate MFR (230° C., 2.16 kg) in [g/10 min] determined according to ISO 1133 of the second propylene polymer (PP2).

According to one embodiment of the present invention, the second propylene polymer (PP2) has a melt flow rate MFR (230° C., 2.16 kg) determined according to ISO 1133 equal or below 10.0 g/10 min.

The present invention is further directed to a heterophasic polypropylene composition (HECO1), comprising
i) a matrix (M) comprising a first propylene polymer (PP1) and a second propylene polymer (PP2) having a melt flow rate MFR (230° C., 2.16 kg) determined according to ISO 1133 equal or below 0.4 g/10 min, and
ii) an elastomeric propylene copolymer (EPR) dispersed within the matrix (M), wherein the ratio MFR(PP1)/MFR(PP2) is above 61, wherein MFR(PP1) is the melt flow rate MFR (230° C., 2.16 kg) in [g/10 min] determined according to ISO 1133 of the first propylene polymer (PP1) and MFR(PP2) is the melt flow rate MFR (230° C., 2.16 kg) in [g/10 min] determined according to ISO 1133 of the second propylene polymer (PP2).

According to one embodiment of the present invention, the first propylene polymer (PP1) has a melt flow rate MFR (230° C., 2.16 kg) determined according to ISO 1133 equal or above 100 g/10 min.

According to another embodiment of the present invention, the matrix (M) comprises the first propylene polymer (PP1) and the second propylene polymer (PP2) in a weight ratio of 99:1 to 80:20.

According to a further embodiment of the present invention, the heterophasic polypropylene composition (HECO1) has a xylene soluble fraction (XCS) in the range of 15.0 to 40.0 wt.-%.

It is especially preferred that the comonomer content of the xylene soluble fraction (XCS) is in the range of 20.0 to 55.0 mol-%.

According to one embodiment of the present invention, the heterophasic polypropylene composition (HECO1) comprises the matrix (M) and the elastomeric propylene copolymer (EPR) in a weight ratio of 70:30 to 30:70.

According to another embodiment of the present invention, the elastomeric propylene copolymer (EPR) comprises
i) a first elastomeric propylene copolymer (EPR1) and
ii) a second elastomeric propylene copolymer (EPR2).
wherein the ratio C(EPR2)/C(EPR1) is in the range of 1.1 to 10.0, wherein C(EPR2) is the comonomer content in [mol-%] of the second elastomeric propylene copolymer (EPR2) and (EPR1) is the comonomer content in [mol-%] of the first elastomeric propylene copolymer (EPR1).

According to one embodiment of the present invention, the heterophasic polypropylene composition (HECO1) has a melt flow rate MFR (230° C., 2.16 kg) determined according to ISO 1133 equal or below 10.0 g/10 min.

It is especially preferred that said heterophasic polypropylene composition (HECO1)
a) is free of phthalic acid esters as well as their respective decomposition products and
b) has 2,1 regio defects of less than 0.4% determined by $^{13}$C-NMR spectroscopy.

The present invention is further directed to a polyolefin composition (C), comprising
i) a polyolefin (PO),
ii) the heterophasic polypropylene composition (HECO1) according to any one of claims 1 to 11, and
iii) optionally an inorganic filler (F).

According to one embodiment of the present invention, said polyolefin composition (C) comprises 5.0 to 30.0 wt.-% of the heterophasic polypropylene composition (HECO1) as described above, based on the overall weight of the polypropylene composition (C).

According to another embodiment of the present invention, the polyolefin (PO) is a polypropylene, preferably a heterophasic polypropylene composition (HECO2) being different to the heterophasic polypropylene composition (HECO1) as described above.

The present invention is further directed to an article, preferably injection moulded article, comprising the polyolefin composition (C) as described above.

The present invention is also directed to the use of a heterophasic polypropylene composition (HECO1) as described above in a composition comprising in addition to said heterophasic polypropylene composition (HECO1) a polyolefin (PO) and optionally an inorganic filler (F) to reduce flow marks of injection moulded articles made from said composition, with the proviso that the polyolefin is not the heterophasic polypropylene composition (HECO1).

In the following, the present invention is describe in more detail.

The heterophasic polypropylene composition (HECO1)

The heterophasic polypropylene composition (HECO1) according to this invention comprises a matrix (M) and dispersed therein an elastomeric propylene copolymer (EPR). Thus the matrix (M) contains (finely) dispersed inclusions being not part of the matrix (M) and said inclusions contain the elastomeric propylene copolymer (EPR). The term inclusion indicates that the matrix (M) and the inclusion form different phases within the heterophasic propylene copolymer (HECO1). The presence of second phase or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the heterophasic polypropylene composition (HECO1) comprises the matrix (M) and the elastomeric propylene copolymer (EPR) in a weight ratio of 70:30 to 30:70, more preferably 60:40 to 40:60, still more preferably 55:45 to 45:55.

Preferably, the heterophasic polypropylene composition (HECO1) according to this invention comprises as polymer components only the matrix (M) and the elastomeric propylene copolymer (EPR). In other words, the heterophasic polypropylene composition (HECO1) may contain further additives but no other polymer in an amount exceeding 5.0 wt.-%, more preferably exceeding 3.0 wt.-%, like exceeding 1.0 wt.-%, based on the total heterophasic polypropylene composition (HECO1). One additional polymer which may be present in such low amounts is a polyethylene which is a reaction by-product obtained by the preparation of the heterophasic polypropylene composition (HECO1). Accordingly, it is in particular appreciated that the instant heterophasic polypropylene composition (HECO1) contains only the matrix (M), the elastomeric propylene copolymer (EPR) and optionally polyethylene in amounts as mentioned in this paragraph.

Preferably, it is desired that the heterophasic polypropylene composition (HECO1) is thermo mechanically stable. Accordingly, it is appreciated that the heterophasic polypropylene composition (HECO1) has a melting temperature of at least 162° C., more preferably in the range of 163 to 167° C., still more preferably in the range of 163 to 165° C.

The heterophasic polypropylene composition (HECO1) comprises apart from propylene also comonomers. Preferably the heterophasic polypropylene composition (HECO1) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene
and
(b) ethylene and/or $C_4$ to $C_8$ α-olefins.

Thus, the heterophasic polypropylene composition (HECO1), i.e. matrix (M) as well as the elastomeric propylene copolymer (EPR), can comprise monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic polypropylene composition (HECO1) according to this invention comprises, especially consists of, monomers copolymerizable with propylene from the group consisting of ethylene, 1-butene and 1-hexene. More specifically, the heterophasic polypropylene composition (HECO1) of this invention comprises—apart from propylene—units derivable from ethylene and/or 1-butene. In a preferred embodiment, the heterophasic polypropylene composition (HECO1) according to this invention comprises units derivable from ethylene and propylene only. Still more preferably the matrix (M) as well as the elastomeric propylene copolymer (EPR) of the heterophasic polypropylene composition (HECO1) contain the same comonomers, like ethylene.

Additionally, it is appreciated that the heterophasic polypropylene composition (HECO1) preferably has a moderate total comonomer content, preferably ethylene content. Thus, it is preferred that the comonomer content of the heterophasic polypropylene composition (HECO1) is in the range from 8.0 to 30.0 mol-%, preferably in the range from 15.0 to 25.0 mol-%, more preferably in the range from 20.0 to 25.0 mol-%.

The xylene cold soluble (XCS) fraction measured according to ISO 16152 (25° C.) of the heterophasic polypropylene composition (HECO1) is in the range of 10.0 to 50.0 wt.-%, preferably in the range from 20.0 to 40.0 wt.-%, more preferably in the range from 25.0 to 35.0 wt.-%, still more preferably in the range from 28.0 to 32.0 wt.-%.

Further it is appreciated that the xylene cold soluble (XCS) fraction of the heterophasic polypropylene composition (HECO1) is specified by its intrinsic viscosity. A low intrinsic viscosity (IV) value reflects a low weight average molecular weight. For the present invention it is appreciated that the xylene cold soluble fraction (XCS) of the heterophasic polypropylene composition (HECO1) has an intrinsic viscosity (IV) measured according to ISO 1628/1 (at 135° C. in decalin) above 3.5 dl/g. More preferably, the heterophasic polypropylene composition (HECO1) has an intrinsic viscosity (IV) in the range of 4.5 to 18.0 dl/g, preferably in the range of 5.7 to 12.0 dl/g, more preferably in the range of 8.0 to 10.0 dl/g.

Additionally, it is preferred that the comonomer content, i.e. ethylene content, of the xylene cold soluble (XCS) fraction of the heterophasic polypropylene composition (HECO1) is in the range of 20.0 to 75.0 mol-%, preferably in the range of 25.0 to 55.0 mol-%, more preferably in the range of 30.0 to 50.0 mol-%, yet more preferably in the range of 35.0 to 45.0 mol-%. The comonomers present in the xylene cold soluble (XCS) fraction are those defined above for the matrix (M) and the elastomeric propylene copolymer (EPR), respectively. In one preferred embodiment the comonomer is ethylene only.

A further characteristic of the heterophasic polypropylene composition (HECO1) is the low amount of regio-irregular insertions of propylene within the polymer chain, which indicates that the heterophasic polypropylene composition (HECO1) is produced in the presence of a Ziegler-Natta catalyst, preferably in the presence of a Ziegler-Natta catalyst (ZN-C1) as defined in more detail below. Accordingly, the heterophasic polypropylene composition (HECO1) is preferably featured by low amount of 2,1 erythro regio-defects, i.e. of equal or below 0.4 mol.-%, more preferably of equal or below than 0.2 mol.-%, like of not more than 0.1 mol.-%, determined by $^{13}$C-NMR spectroscopy. In an especially preferred embodiment no 2,1 erythro regio-defects are detectable.

The heterophasic polypropylene composition (HECO1) can be further defined by its individual components, i.e. the matrix (M) and the elastomeric propylene copolymer (EPR).

The matrix (M) can be a propylene copolymer or a propylene homopolymer, the latter being preferred.

In case the matrix (M) is a propylene copolymer, the matrix (M) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the matrix (M) according to this invention comprises, especially consists of, monomers copolymerizable with propylene from the group consisting of ethylene, 1-butene and 1-hexene. More specifically the matrix (M) of this invention comprises—apart from propylene—units derivable from ethylene and/or 1-butene. In a preferred embodiment the matrix (M) comprises units derivable from ethylene and propylene only.

The matrix (M) according to this invention has a melt flow rate $MFR_2$ (230° C./2.16 kg) measured according to ISO 1133 in the range of 70 to 450 g/10 min, more preferably in the range of 100 to 400 g/10 min, still more preferably in the range of 200 to 350 g/10 min.

As mentioned above the heterophasic polypropylene composition (HECO1) is featured by an average comonomer content. Accordingly, the comonomer content of the matrix (M) is in the range of 0.0 to 5.0 mol.-%, yet more preferably in the range of 0.0 to 3.0 mol.-%, still more preferably in the range of 0.0 to 1.0 mol.-%. It is especially preferred that the matrix (M) is a propylene homopolymer.

The matrix (M) preferably comprises at least two polymer fractions, like two or three polymer fractions, all of them are propylene homopolymers. At least one of the fractions has preferably a high molecular weight and an average ($MFR_2$ (230° C./2.16 kg) 20-100 g/10 min) molecular weight fractions.

Accordingly, it is preferred that the matrix (M) comprises, preferably consists of, a first propylene polymer (PP1) being the low molecular weight fraction having a high melt flow rate and a second propylene polymer (PP2) being the high molecular weight fraction having a low melt flow rate.

Said first propylene polymer (PP1) being the low molecular weight fraction may comprise a propylene polymer (PP1a) having a melt flow rate MFR (230° C., 2.16 kg) determined according to ISO 1133 equal or above 200 g/10 min and a propylene polymer (PP1b) having a melt flow rate MFR (230° C., 2.16 kg) determined according to ISO 1133 in the range of 20 to 100 g/10 min.

The weight ratio between the first propylene polymer (PP1) and second propylene polymer (PP2) preferably is 99:1 to 80:20, more preferably 99:1 to 90:10, still more preferably 99:1 to 95:5.

Preferably, the first propylene polymer (PP1) and the second propylene polymer (PP2) differ in the melt flow rate.

Accordingly, one of the propylene homopolymer fractions (PP1) and (PP2) of the matrix (M) is the high melt flow rate $MFR_2$ (230° C./2.16 kg) fraction and the other fraction is the low melt flow rate $MFR_2$ (230° C./2.16 kg) fraction.

According to one embodiment of the present invention, the ratio MFR(PP1)/MFR(PP2) is above 520, more preferably above 1000, still more preferably above 2000, yet more preferably above 10,000, like above 30,000, wherein MFR (PP1) is the melt flow rate MFR (230° C., 2.16 kg) in [g/10 min] determined according to ISO 1133 of the first propylene polymer (PP1) and MFR(PP2) is the melt flow rate MFR (230° C., 2.16 kg) in [g/10 min] determined according to ISO 1133 of the second propylene polymer (PP2).

Additionally or alternatively to the previous paragraph, the propylene homopolymer fractions (PP1) and (PP2) fulfil in-equation (I), more preferably in-equation (Ia), still more preferably in-equation (Ib), $$\frac{MFR(PP1)}{MFR(PP2)} \geq 520, \tag{I}$$

$$5{,}000 \geq \frac{MFR(PP1)}{MFR(PP2)} \geq 600, \tag{Ia}$$

$$100{,}000 \geq \frac{MFR(PP1)}{MFR(PP2)} \geq 5{,}000, \tag{Ib}$$

wherein MFR(PP1) is the melt flow rate MFR (230° C., 2.16 kg) in [g/10 min] determined according to ISO 1133 of the first propylene polymer (PP1) and MFR(PP2) is the melt flow rate MFR (230° C., 2.16 kg) in [g/10 min] determined according to ISO 1133 of the second propylene polymer (PP2).

Accordingly, it is preferred that the first propylene polymer (PP1) has a melt flow rate MFR (230° C./2.16 kg) determined according to ISO 1133 equal or above 100 g/10 min, more preferably in the range of 200 to 1000 g/10 min, still more preferably in the range of 300 to 700 g/10 min, like in the range of 400 to 600 g/10 min.

The second propylene polymer (PP2) preferably has a melt flow rate MFR (230° C./2.16 kg) determined according to ISO 1133 equal or below 10.0 g/10 min, more preferably below 0.4 g/10 min, still more preferably below 0.1 g/10 min, like below 0.05 g/10 min.

According to another embodiment of the present invention, the second propylene polymer (PP2) has a melt flow rate MFR (230° C./2.16 kg) determined according to ISO 1133 equal or below 0.4 g/10 min.

According to this embodiment, the ratio MFR(PP1)/MFR (PP2) is above 61, more preferably above 100, still more preferably above 400, wherein MFR(PP1) is the melt flow rate MFR (230° C., 2.16 kg) in [g/10 min] determined according to ISO 1133 of the first propylene polymer (PP1) and MFR(PP2) is the melt flow rate MFR (230° C., 2.16 kg) in [g/10 min] determined according to ISO 1133 of the second propylene polymer (PP2).

The heterophasic polypropylene composition (HECO1) preferably comprises 40.0 to 80.0 wt.-%, more preferably 45.0 to 70.0 wt.-%, still more preferably 50.0 to 60.0 wt.-% of the matrix (M), based on the total weight of the heterophasic polypropylene composition (HECO1).

Additionally, the heterophasic polypropylene composition (HECO1) preferably comprises 10.0 to 55.0 wt.-%, more preferably 20.0 to 50.0 wt.-%, still more preferably 27.0 to 46.0 wt.-% of the elastomeric propylene copolymer (EPR), based on the total weight of the heterophasic polypropylene composition (HECO1).

Thus, it is appreciated that the heterophasic polypropylene composition (HECO1) preferably comprises 40.0 to 80.0 wt.-%, more preferably 45.0 to 73.0 wt.-%, still more preferably 50.0 to 60.0 wt.-% of the matrix (M) and 10.0 to 55.0 wt.-%, more preferably 20.0 to 50.0 wt.-%, still more preferably 27.0 to 46.0 wt.-% of the elastomeric propylene copolymer (EPR), based on the total weight of the heterophasic polypropylene composition (HECO1).

In particular, it is appreciated that the heterophasic polypropylene composition (HECO1) preferably comprises, more preferably consists of, 35.0 to 78.0 wt.-%, more preferably 40.0 to 73.0 wt.-%, still more preferably 50.0 to 60.0 wt.-% of the first propylene polymer (PP1), 0.1 to 10.0 wt.-%, still more preferably 1.0 to 5.0 wt.-%, still more preferably 1.8 to 2.3 wt.-% of the second propylene (PP2) and 10.0 to 55.0 wt.-%, more preferably 20.0 to 50.0 wt.-%, still more preferably 27.0 to 46.0 wt.-% of the elastomeric propylene copolymer (EPR), based on the total weight of the heterophasic polypropylene composition (HECO1).

Accordingly, a further component of the heterophasic polypropylene composition (HECO1) is the elastomeric propylene copolymer (EPR) dispersed in the matrix (M) being the matrix (M). The elastomeric propylene copolymer (EPR) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (EPR) comprises, especially consists of, monomers copolymerizable with propylene from the group consisting of ethylene, 1-butene and 1-hexene. More specifically, the elastomeric propylene copolymer (EPR) comprises—apart from propylene—units derivable from ethylene and/or 1-butene. Thus, in an especially preferred embodiment the elastomeric propylene copolymer (EPR) comprises units derivable from ethylene and propylene only.

The comonomer content of the elastomeric propylene copolymer (EPR) preferably is in the range of 20.0 to 75.0 mol-%, preferably in the range of 20.0 to 55.0 mol-%, more preferably in the range of 30.0 to 50.0 mol.-%, yet more preferably in the range of 35.0 to 45.0 mol.-%.

According to one embodiment of the present invention, the elastomeric propylene copolymer (EPR) comprises at least one polymer fraction, like two or three polymer fractions, all of them are propylene copolymers. Even more preferred the elastomeric propylene copolymer (EPR) comprises, preferably consists of, a first elastomeric propylene copolymer (EPR1) and a second elastomeric propylene copolymer (EPR2).

The weight ratio between the first elastomeric propylene copolymer (EPR1) and second elastomeric propylene copolymer (EPR2) preferably is 90:10 to 10:90, more preferably 80:20 to 20:80, still more preferably 67:33 to 33:67.

Accordingly, it is appreciated that the heterophasic polypropylene composition (HECO1) preferably comprises, more preferably consists of, 35.0 to 78.0 wt.-%, more preferably 40.0 to 73.0 wt.-%, still more preferably 50.0 to 60.0 wt.-% of the first propylene polymer (PP1), 0.1 to 10.0 wt.-%, still more preferably 1.0 to 5.0 wt.-%, still more preferably 1.8 to 2.3 wt.-% of the second propylene (PP2), 18.0 to 40.0 wt.-%, more preferably 20.0 to 35 wt.-%, still more preferably 23.0 to 31.0 wt.-% of the first elastomeric propylene copolymer (EPR1) and 10.0 to 31.0 wt.-%, more preferably 12.0 to 30 wt.-%, still more preferably 15.0 to 29.0 wt.-% of the second elastomeric propylene copolymer (EPR2), based on the total weight of the heterophasic polypropylene composition (HECO1).

Preferably, the first elastomeric propylene copolymer (EPR1) and the second elastomeric propylene copolymer (EPR2) differ in the comonomer content.

Accordingly, one of the elastomeric propylene copolymer fractions (EPR1) and (EPR2) of the elastomer propylene copolymer (EPR) is the low comonomer content fraction and the other fraction is the high comonomer content fraction.

In particular, it is preferred that the ratio C(EPR2)/C(EPR1) is in the range of 1.1 to 10.0, more preferably in the range of 1.2 to 5.0, still more preferably in the range of 1.3 to 3.2, wherein C(EPR2) is the comonomer content in [mol-%] of the second elastomeric propylene copolymer (EPR2) and (EPR1) is the comonomer content in [mol-%] of the first elastomeric propylene copolymer (EPR1).

Accordingly, it is preferred that the first elastomeric propylene copolymer (EPR1) has a comonomer content, more preferably ethylene content, in the range of 20.0 to 45.0 mol-%, more preferably in the range of 20.0 to 35.0 mol-%, still more preferably in the range of 23.0 to 30.0 mol-%.

Additionally or alternatively to the previous paragraph, it is preferred that the second elastomeric propylene copolymer (EPR2) has a comonomer content, more preferably ethylene content, in the range of 46.0 to 75.0 mol-%, more preferably in the range of 55.0 to 74.0 mol-%, still more preferably in the range of 65.0 to 73.0 mol-%.

The heterophasic polypropylene composition (HECO1) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

According to a preferred embodiment of the present invention, the heterophasic polypropylene composition (HECO1) contains an α-nucleating agent.

In case the heterophasic polypropylene composition (HECO1) comprises an α-nucleating agent, it is preferred that it is free of β-nucleating agents. The α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4, 6,-di-tert-butylphenyl) phosphate or aluminum-hydroxy-bis[2,2'-methylene-bis(4,6-di-t-butylphenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", pages 871 to 873, 5th edition, 2001 of Hans Zweifel.

Preferably the heterophasic polypropylene composition (HECO1) contains up to 5.0 wt.-% of the α-nucleating agent. In a preferred embodiment, the propylene homopolymer contains not more than 500 ppm, more preferably of 0.025 to 200 ppm, more preferably of 0.1 to 200 ppm, still more preferably 0.3 to 200 ppm, most preferably 0.3 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, sodium 2,2'-methylenebis (4, 6,-di-tert-butylphenyl) phosphate, vinylcycloalkane polymer, vinylalkane polymer, and mixtures thereof.

Further, it is preferred that the heterophasic polypropylene composition (HECO1) has a flexural modulus determined according to ISO 178 on injection molded specimens above 500 MPa, more preferably in the range of 500 to 1500 MPa, still more preferably in the range of 600 to 1000 MPa.

Preferably, the heterophasic polypropylene composition (HECO1) has a Charpy notched impact strength determined according to ISO 179/1 eA at 23° C. of at least 10.0 kJ/m$^2$, more preferably at least 20.0 kJ/m$^2$, still more preferably at least 30.0 kJ/m$^2$.

Additionally or alternatively to the previous paragraph, the heterophasic polypropylene composition (HECO1) has a Charpy notched impact strength determined according to ISO 179/1 eA at −20° C. of at least 2.5 kJ/m$^2$.

According to one embodiment of the present invention, the heterophasic polypropylene composition (HECO1) can be produced by blending the matrix (M) and the elastomeric propylene copolymer (EPR).

In particular, the heterophasic polypropylene composition (HECO1) can be produced by blending, preferably melt blending, the first propylene polymer (PP1), the second propylene polymer (PP2) and the elastomeric propylene copolymer (EPR) in a ratio as described above.

In case the elastomeric propylene copolymer (EPR) comprises a first elastomeric propylene copolymer (EPR1) and a second elastomeric propylene copolymer (EPR2), it is preferred that the heterophasic polypropylene composition (HECO1) is produced by blending, preferably melt blending, the first propylene polymer (PP1), the second propylene polymer (PP2), the first elastomeric propylene copolymer (EPR1) and the second elastomeric propylene copolymer (EPR2) in a ratio as described above.

According to another embodiment of the present invention, it is preferred that the heterophasic polypropylene composition (HECO1) is produced in a sequential step process, using reactors in serial configuration and operating at different reaction conditions. As a consequence, each fraction prepared in a specific reactor may have its own molecular weight distribution and/or comonomer content distribution.

Accordingly, it is preferred that the heterophasic polypropylene composition (HECO1) is produced in a sequential polymerization process comprising the steps of (a1) polymerizing propylene and optionally at least one ethylene and/or C$_4$ to C$_{12}$ α-olefin in a first reactor (R1) obtaining the first polypropylene fraction of the matrix (M), i.e. the first propylene polymer (PP1), preferably said first polypropylene fraction is a propylene homopolymer, (b1) transferring the first polypropylene fraction into a second reactor (R2), (c1) polymerizing in the second reactor (R2) and in the presence of said first polypropylene fraction propylene and optionally at least one ethylene and/or C$_4$ to C$_{12}$ α-olefin obtaining thereby the second polypropylene fraction, i.e. the second propylene polymer (PP2), preferably said second polypropylene fraction is a second propylene homopolymer, said first polypropylene fraction and said second polypropylene fraction form the matrix (M), i.e. the matrix of the heterophasic polypropylene composition (HECO1), (d1) optionally transferring the matrix (M) of step (c1) into a third reactor (R3), (e1) optionally polymerizing in the third reactor (R3) and in the presence of the matrix (M) obtained in step (e1) propylene and ethylene to obtain the first propylene copolymer fraction of the elastomeric propylene copolymer (EPR) dispersed in the matrix (M), (f1) transferring the matrix (M) and the first propylene copolymer fraction of the elastomeric propylene copolymer (EPR) into a fourth reactor (R4), (g1) polymerizing in the fourth reactor (R4) and in the presence of the matrix (M) and the first propylene copolymer fraction of the second elastomeric propylene copolymer (EPR) propylene and ethylene to obtain the second propylene copolymer fraction of the elastomeric propylene copolymer (EPR) dispersed in the matrix (M), the matrix (M) and the elastomeric propylene copolymer (EPR) form the heterophasic polypropylene composition (HECO1).

Of course, in the first reactor (R1) the second polypropylene fraction can be produced and in the second reactor (R2) the first polypropylene fraction can be obtained. The same holds true for the elastomeric propylene copolymer phase.

Preferably between the first reactor (R1), the second reactor (R2), the third reactor (R3) and the fourth reactor (R4) the monomers are flashed out.

According to still another preferred embodiment of the present invention, the heterophasic polypropylene composition (HECO1) is obtained by producing a heterophasic system (H) comprising the first propylene polymer (PP1) and the elastomeric propylene copolymer (EPR) in a sequential step process and subsequently blending, preferably melt blending, said heterophasic system (H) with the second propylene polymer (PP2).

Accordingly, it is preferred that the heterophasic polypropylene composition (HECO1) is produced in a sequential polymerization process comprising the steps of (a2) polymerizing propylene and optionally at least one ethylene and/or C$_4$ to C$_{12}$ α-olefin in a first reactor (R1) obtaining a first low molecular weight polypropylene fraction of the matrix (M), i.e. the propylene polymer (PP1a), preferably said first polypropylene fraction is a propylene homopolymer, (b2) optionally transferring the first polypropylene fraction of the matrix (M) of step (a2) into a second reactor (R2), (c2) optionally polymerizing propylene and optionally at least one ethylene and/or C$_4$ to C$_{12}$ α-olefin in the second reactor (R2) in the presence of the first low molecular weight polypropylene fraction of the matrix (M) obtaining a second low molecular weight polypropylene fraction of the matrix (M), i.e. the propylene polymer (PP1b), preferably said first polypropylene fraction is a propylene homopolymer, (d2) optionally transferring the first low molecular weight polypropylene fraction and, if present, the second low molecular weight fraction of the matrix (M) of step (c2) into a third reactor (R3), (e2) optionally polymerizing in the third reactor (R3) and in the presence of the first low molecular weight polypropylene fraction and, if present, the second low molecular weight fraction of the matrix (M) obtained in step (c2) propylene and ethylene to obtain the first propylene copolymer fraction of the elastomeric propylene copolymer (EPR) dispersed in the matrix (M), (f2) transferring the first low molecular weight polypropylene fraction and, if present, the second low molecular weight fraction of the matrix of the matrix (M) and optionally the first propylene copolymer fraction of the elastomeric propylene copolymer (EPR) into a fourth reactor (R4), (g2) polymerizing in the fourth reactor (R4) and in the presence of the first low molecular weight polypropylene fraction and, if present, the second low molecular weight fraction of the matrix (M) and, if present, the first propylene copolymer fraction of the second elastomeric propylene copolymer (EPR) propylene and ethylene to obtain the second propylene copolymer fraction of the elastomeric propylene copolymer (EPR) dispersed in the first low molecular weight polypropylene fraction and, if present, the second low molecular weight fraction of the matrix (M), thereby obtaining the heterophasic system (H), (h2) melt blending the heterophasic system (H) comprising the first low molecular weight polypropylene fraction and optionally the second low molecular weight polypropylene fraction of the matrix (M) and the elastomeric propylene copolymer (EPR) with the high molecular weight fraction of the matrix (M), i.e. the second propylene polymer (PP2) in a ratio as defined above, thereby obtaining the heterophasic polypropylene composition (HECO1).

Preferably between the first reactor (R1), the second reactor (R2), the third reactor (R3) and the fourth reactor (R4), the monomers are flashed out.

The term "sequential polymerization process" indicates that the heterophasic polypropylene composition (HECO1) is produced in at least two, like three or four reactors connected in series. Accordingly, the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least three, preferably three polymerization reactors, namely two slurry reactors (SR), like two loop reactors (LR), and two gas phase reactors (GPR-1) and (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic polypropylene composition (HECO1) as defined above the conditions for the first reactor (R1), i.e. the slurry reactor (SR), like a loop reactor (LR), of step (a) may be as follows:
 the temperature is within the range of 50° C. to 110° C., preferably between 60° C. and 100° C., more preferably between 68 and 95° C.,
 the pressure is within the range of 20 bar to 80 bar, preferably between 40 bar to 70 bar,
 hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
 the temperature is within the range of 50° C. to 130° C., preferably between 60° C. and 100° C.,
 the pressure is within the range of 5 bar to 50 bar, preferably between 21 bar to 26 bar,
 hydrogen can be added for controlling the molar mass in a manner known per se.

Subsequently, the reaction mixture from step (c) is transferred to the third reactor (R3), i.e. gas phase reactor (GPR-2), i.e. to step (e), whereby the conditions in step (e) are preferably as follows:
 the temperature is within the range of 50° C. to 130° C., preferably between 60° C. and 100° C.,
 the pressure is within the range of 5 bar to 50 bar, preferably between 13 bar to 26 bar,
 hydrogen can be added for controlling the molar mass in a manner known per se.

Optionally, the reaction mixture from step (e) is transferred to the fourth reactor (R4), i.e. gas phase reactor (GPR-3), i.e. to step (g), whereby the conditions in step (g) are preferably as follows:
 the temperature is within the range of 50° C. to 130° C., preferably between 60° C. and 100° C.,
 the pressure is within the range of 5 bar to 50 bar, preferably between 13 bar to 26 bar,
 hydrogen can be added for controlling the molar mass in a manner known per se.

The residence time can vary in the respective reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

For a continuous multi-reactor polymerization setup, the reactors are separated by space, e.g. the first reactor (R1), the second reactor (R2), the third reactor (R3) and the fourth reactor (R4) are separate standalone vessels. For a bench-scale laboratory batch single reactor polymerization setup the reactors are separated by time, e.g. the first reactor (R1) and the second reactor (R2) are the same vessel, in which the first propylene polymer (PP1) and the second propylene polymer (PP2) are produced first according to the first reactor (R1) specific conditions for a certain time (e.g. bulk polymerization), and then the resulting material is subjected to the second reactor (R2) specific conditions for a certain time (e.g. gas phase polymerization) staying physically in the same single polymerization reactor.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 30° C.

The pressure in the prepolymerization reactor (PR) is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

The heterophasic polypropylene composition (HECO1) according to this invention is preferably produced in the presence of
(a) a Ziegler-Natta catalyst (ZN-C1) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester and still more preferably is a diester of non-phthalic dicarboxylic acids;
(b) a co-catalyst (Co), and
(c) optionally an external donor (ED).

It is preferred that the internal donor (ID) is selected from optionally substituted malonates, maleates, succinates, glutarates, cyclohexene-1,2-dicarboxylates, benzoates and derivatives and/or mixtures thereof, preferably the internal donor (ID) is a citraconate. Additionally or alternatively, the molar-ratio of co-catalyst (Co) to external donor (ED) [Co/ED] is 5 to 45.

In view of the above, it is appreciated that the heterophasic polypropylene composition (HECO1) is free of phthalic acid esters as well as their respective decomposition products, i.e. phthalic acid esters, typically used as internal donor of Ziegler-Natta (ZN) catalysts. Preferably, the propylene homopolymer is free of phthalic compounds as well as their respective decomposition products, i.e. phthalic compounds typically used as internal donor of Ziegler-Natta (ZN) catalysts.

The term "free of" phthalic acid esters, preferably phthalic compounds, in the meaning of the present invention refers to a propylene polymer in which no phthalic acid esters as well no respective decomposition products, preferably no phthalic compounds as well as no respective decomposition products at all, are detectable.

Due to the above defined process conditions in the pre-polymerization, preferably a mixture (MI) of the Ziegler-Natta catalyst (ZN-C1) and the polypropylene (Pre-PP) produced in the pre-polymerization reactor (PR) is obtained. Preferably the Ziegler-Natta catalyst (ZN-C1) is (finely) dispersed in the polypropylene (Pre-PP). In other words, the Ziegler-Natta catalyst (ZN-C1) particles introduced in the pre-polymerization reactor (PR) split into smaller fragments which are evenly distributed within the growing polypropylene (Pre-PP). The sizes of the introduced Ziegler-Natta catalyst (ZN-C1) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C1) and the polypropylene (Pre-PP) produced in the pre-polymerization reactor (PR) is transferred to the first reactor (R1). Typically the total amount of the polypropylene (Pre-PP) in the final heterophasic polypropylene composition (HECO1) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst (ZN-C1) are directly introduced into the first polymerization reactor (R1).

The catalyst used in the present invention is a solid Ziegler-Natta catalyst (ZN-C1), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C1) can be further defined by the way as obtained. Accordingly, the Ziegler-Natta catalyst (ZN-C1) is preferably obtained by a process comprising the steps of
a)
  $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or a$_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or a$_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C1) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of a$_2$) or a$_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" (OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m², more preferably below 10 g/m². Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C1) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a{}_p R^b{}_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the cyclohexylmethyl dimethoxy silane donor (C-Donor) or the pentyl dimethoxy silane donor (D-donor), the latter especially preferred.

In addition to the Ziegler-Natta catalyst (ZN-C1) and the optional external donor (ED) a co-catalyst is used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkylaluminum, like triethylaluminum (TEAL), dialkyl aluminum chloride or alkyl aluminum dichloride or mixtures thereof. In one specific embodiment the co-catalyst (Co) is triethylaluminum (TEAL).

Advantageously, the triethyl aluminum (TEAL) has a hydride content, expressed as AlH$_3$, of less than 1.0 wt % with respect to the triethyl aluminum (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the molar ratio of co-catalyst (Co) to external donor (ED) [Co/ED] can be in the range of 5 to 45, preferably is in the range of 5 to 35, more preferably is in the range of 5 to 25; and optionally
(b) the molar ratio of co-catalyst (Co) to titanium compound (TC) [Co/TC] can be in the range of above 80 to 500, preferably is in the range of 100 to 350, still more preferably is in the range of 120 to 300.

In a further embodiment, the Ziegler-Natta catalyst (ZN-C1) can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO1) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polyolefin Composition (C)

As outlined above, the present invention is further directed to a polyolefin composition (C) comprising a polyolefin (PO), the heterophasic polypropylene composition (HECO1) described above, and optionally an inorganic filler (F).

It is preferred that the polyolefin composition (C) comprises 50.0 to 95.0 wt.-%, more preferably 60.0 to 80.0 wt.-%, still more preferably 69.0 to 75.0 wt.-% of the polyolefin (PO) and 5.0 to 30.0 wt.-%, more preferably 8.0 to 20.0 wt.-%, still more preferably 9.0 to 15.0 wt.-% of the heterophasic polypropylene composition (HECO1), based on the overall weight of the polyolefin composition (C).

Additionally or alternatively to the previous paragraph, it is preferred that the polyolefin composition (C) comprises the polyolefin (PO) and the heterophasic polypropylene composition (HECO1) in a weight ratio of 99:1 to 70:30, more preferably 95:5 to 80:20, still more preferably 90:10 to 82:18.

The polyolefin composition (C) may further comprise an inorganic filler.

Accordingly, it is preferred that the polyolefin composition (C) comprises 50.0 to 95.0 wt.-%, more preferably 60.0 to 80.0 wt.-%, still more preferably 69.0 to 75.0 wt.-% of the polyolefin (PO), 5.0 to 30.0 wt.-%, more preferably 8.0 to 20.0 wt.-%, still more preferably 9.0 to 15.0 wt.-% of the heterophasic polypropylene composition (HECO1) and 5.0 to 20.0 wt.-%, more preferably 9.0 to 18.0 wt.-%, still more preferably 10.0 to 15.0 wt.-% of the inorganic filler (F), based on the overall weight of the polyolefin composition (C).

The polyolefin composition (C) of the present invention may include additives (AD).

Accordingly, it is preferred that the polyolefin composition (C) comprises, more preferably consists of, 50.0 to 95.0 wt.-%, more preferably 60.0 to 80.0 wt.-%, still more preferably 68.0 to 75.0 wt.-% of the polyolefin (PO), 5.0 to 30.0 wt.-%, more preferably 8.0 to 20.0 wt.-%, still more preferably 9.0 to 15.0 wt.-% of the heterophasic polypropylene composition (HECO1), 5.0 to 20.0 wt.-%, more preferably 9.0 to 18.0 wt.-%, still more preferably 10.0 to 15.0 wt.-% of the inorganic filler (F) and 0.0 to 5.0 wt.-%, more preferably 0.1 to 3.0 wt.-%, still more preferably 0.5 to 1.5 wt.-% of additives (AD), based on the overall weight of the polyolefin composition (C). The additives (AD) are described in more detail below.

Preferably, the polyolefin composition (C) has a rather high melt flow rate. Accordingly, it is preferred that the polyolefin composition (C) has a melt flow rate MFR (230° C., 2.16 kg) determined according to ISO 1133 in the range of 8.0 to 35.0 g/10 min, more preferably in the range of 10.0 to 30.0 g/10 min, still more preferably in the range of 14.0 to 25.0 g/10 min.

Further, it is preferred that the polyolefin composition (C) according to the present invention is featured by a rather high stiffness. In particular, it is preferred that the polyolefin composition (C) has a flexural modulus determined according to ISO 178 on injection molded specimens above 900 MPa, more preferably in the range of 1000 to 3000 MPa, still more preferably in the range of 1300 to 2000 MPa.

Preferably, the polyolefin composition (C) has a Charpy notched impact strength determined according to ISO 179/1 eA at 23° C. of at least 10.0 kJ/m², more preferably at least 20.0 kJ/m², still more preferably at least 35.0 kg/m², like at least 42.0 kg/m².

Additionally or alternatively to the previous paragraph, the polyolefin composition (C) has a Charpy notched impact strength determined according to ISO 179/1 eA at −20° C. of at least 4.0 kJ/m², more preferably at least 5.0 kJ/m², still more preferably at least 7.0 kg/m².

As outlined above, the polyolefin composition (C) comprises a polyolefin (PO). Said polyolefin (PO) may comprise monomeric units derived from ethylene and/or $C_3$ to $C_{12}$-α-olefins. Preferably, the polyolefin (PO) comprises monomeric units derived from ethylene, propylene, 1-butene and/or 1-hexene. It is especially preferred that the polyolefin (PO) is a polypropylene.

In particular, it is preferred that the polyolefin (PO) is a heterophasic polypropylene composition (HECO2) being different to the heterophasic polypropylene composition (HECO1) described above.

The heterophasic polypropylene composition (HECO2) preferably comprises a (semi)crystalline polypropylene (PP) as a matrix in which an elastomeric propylene copolymer (E) is dispersed. Accordingly the elastomeric propylene copolymer (E) is (finely) dispersed in the (semi)crystalline polypropylene (PP). In other words the (semi)crystalline polypropylene (PP) constitutes a matrix in which the elastomeric propylene copolymer (E) forms inclusions in the matrix, i.e. in the (semi)crystalline polypropylene (PP). Thus the matrix contains (finely) dispersed inclusions being not part of the matrix and said inclusions contain the elastomeric propylene copolymer (E). Regarding the term "inclusion", reference is made to the definition provided above.

Preferably, the heterophasic polypropylene composition (HECO2) has a melt flow rate $MFR_2$ (230° C., 2.16 kg) in the range of 8 to 160 g/10 min, more preferably in the range of 9 to 70 g/10 min, still more preferably in the range of 10 to 35 g/10 min.

As mentioned above, the heterophasic polypropylene composition (HECO2) according to this invention preferably comprises
(a) a (semi)crystalline polypropylene (PP) as the matrix and
(b) an elastomeric propylene copolymer (E).

Preferably the weight ratio between the (semi)crystalline polypropylene (PP) and the elastomeric propylene copolymer (E) [PP/E] of the heterophasic polypropylene composition (HECO2) is in the range of 80/20 to 40/60, more preferably in the range of 75/25 to 45/55, yet more preferably in the range of 70/30 to 50/50, like in the range of 70/30 to 60/40.

Preferably, the heterophasic polypropylene composition (HECO2) has a comonomer content, preferably ethylene content, of equal or below 30.0 mol.-%, more preferably in the range of 10.0 to 30.0 mol.-%, still more preferably in the range of 12.0 to 28.0 mol.-%, yet more preferably in the range of 13.0 to 25.0 mol.-%.

Preferably the heterophasic polypropylene composition (HECO2) has a xylene cold soluble (XCS) fraction (25° C.) in the range of 20 to 45 wt.-%, more preferably in the range of 23 to 40 wt.-%, still more preferably in the range of 25 to 38 wt.-% and most preferably in the range of 28 to 35 wt.-%.

Preferably, the comonomer content, more preferably the ethylene content of the xylene cold soluble fraction (XCS) of the heterophasic polypropylene composition (HECO2) is in the range of 30.0 to 60 mol.-%, more preferably in the range of 35.0 to 58.0 mol.-%, still more preferably in the range of 40.0 to 55.0 mol-%, yet more preferably in the range of 45.0 to 52.0 mol.-%.

In a preferred embodiment the intrinsic viscosity (IV) of the xylene cold soluble fraction (XCS) of the heterophasic polypropylene composition (HECO2) is at least 2.0 dl/g, more preferably at least 2.5 dl/g. On the other hand the intrinsic viscosity (IV) should be not too high otherwise the flowability is decreased. Thus the intrinsic viscosity of xylene cold soluble fraction (XCS) of the heterophasic polypropylene composition (HECO2) is preferably in the range of 2.0 to 4.0 dl/g, more preferably in the range 2.1 to 3.8 dl/g and even more preferably in the range of 2.3 to 3.6 dl/g.

The (semi)crystalline polypropylene (PP) is preferably a (semi)crystalline random propylene copolymer (R-PP) or a (semi)crystalline propylene homopolymer (H-PP), the latter especially preferred.

In case the (semi)crystalline polypropylene (PP) is a (semi)crystalline random propylene copolymer (R-PP) it is appreciated that the (semi)crystalline random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP) according to this invention comprises, especially consists of, monomers co-polymerizable with propylene from the group consisting of ethylene, 1-butene and 1-hexene. More specifically the (semi)crystalline random propylene copolymer (R-PP) of this invention comprises—apart from propylene—units derivable from ethylene and/or 1-butene. In a preferred embodiment the (semi)crystalline random propylene copolymer (R-PP) comprises units derivable from ethylene and propylene only.

Additionally it is appreciated that the (semi)crystalline random propylene copolymer (R-PP) has preferably a comonomer content in the range of more than 0.3 to 1.5 mol.-%, more preferably in the range of more than 0.35 to 1.2 mol.-%, yet more preferably in the range of 0.4 to 1.0 mol.-%.

Further it is appreciated that the (semi)crystalline polypropylene (PP), like (semi)crystalline propylene homopolymer (H-PP), has a melt flow rate $MFR_2$ (230° C.) measured according to ISO 1133 of 20 to 400 g/10 min, more preferably of 30 to 270 g/10 min, still more preferably of 40 to 160 g/10 min, still more preferably of 50 to 100 g/10 min.

Further it is preferred that the semicrystalline polypropylene (PP) according to this invention has a xylene soluble fraction (XCS) of not more than 10 wt.-%, in case of a (semi)crystalline propylene homopolymer (H-PP) the xylene soluble fraction (XCS) is even lower, i.e. not more than 6.0 wt.

Accordingly it is preferred that the (semi)crystalline propylene homopolymer (H-PP) has a xylene soluble fraction (XCS) of below 5.0 wt.-%, more preferably in the range of 0.5 to 4.5, like in the range of 1.0 to 3.5 wt.-%.

The second component of the heterophasic polypropylene composition (HECO2) is the elastomeric propylene copolymer (E).

The elastomeric propylene copolymer (E) comprises, preferably consists of, units derivable from (i) propylene and (ii) ethylene.

The comonomer content, more preferably ethylene content of the elastomeric propylene copolymer (E) of the heterophasic polypropylene composition (HECO2) is in the range of 30.0 to 60 mol.-%, more preferably in the range of 35.0 to 58.0 mol.-%, still more preferably in the range of 40.0 to 55.0 mol.-%, yet more preferably in the range of 45.0 to 52.0 mol.-%, like in the range of 46.0 to 50.0 mol.-%.

The heterophasic polypropylene composition (HECO2) can be produced by blending the (semi)crystalline polypropylene (PP) and the elastomeric propylene copolymer (EPR). However, it is preferred that the heterophasic composition (HECO) is produced in a sequential step process, using reactors in serial configuration and operating at different reaction conditions. As a consequence, each fraction prepared in a specific reactor may have its own molecular weight distribution and/or comonomer content distribution.

The heterophasic polypropylene composition (HECO2) is preferably a heterophasic polypropylene composition known in the art.

The polyolefin composition (C) may further comprise an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc.

The most preferred inorganic fillers (F) are talc and/or wollastonite.

It is appreciated that the inorganic filler (F) has median particle size ($D_{50}$) in the range of 0.5 to 20.0 μm and a top cut particle size ($D_{95}$) in the range of 2.0 to 20.0 μm, preferably a median particle size ($D_{50}$) in the range of 1.0 to 8.0 μm and top cut particle size ($D_{95}$) in the range of 3.0 to 10.0 μm, more preferably a median particle size ($D_{50}$) in the range of 1.2 to 5.0 μm and top cut particle size ($D_{95}$) of 4.0 to 8.5 μm.

According to this invention the filler (F) does not belong to the class of alpha nucleating agents and additives (AD).

The filler (F) is state of the art and a commercially available product.

In addition to the polyolefin (PO) and the heterophasic polypropylene composition (HECO1) and optionally the inorganic filler (F), the polyolefin composition (C) of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", $6^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polyolefin composition (C) of the invention does not comprise (a) further polymer (s) different to the polyolefin (PO) and the heterophasic polypropylene composition (HECO1), in an amount exceeding 15 wt.-%, preferably in an amount exceeding 10 wt.-%, more preferably in an amount exceeding 9 wt.-%, based on the weight of the polypropylene composition (C). Any polymer being a carrier material for additives (AD) is not calculated to the amount of polymeric compounds as indicated in the present invention, but to the amount of the respective additive.

The polymeric carrier material of the additives (AD) is a carrier polymer to ensure a uniform distribution in the polyolefin composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer. It is preferred that the polymeric carrier material does not contain monomeric units derivable from styrene or derivatives thereof.

The polyolefin composition (C) according to the present invention is preferably obtained by melt blending the polyolefin (PO) with the heterophasic polypropylene composition (HECO1), optionally the inorganic filler (F) and optionally the additives (AD).

The Article

The polyolefin composition (C) of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably at least 60 wt.-%, more preferably at least 80 wt.-%, yet more preferably at least 95 wt.-%, like consisting of, the inventive polyolefin composition (C). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive polyolefin composition (C).

The Use

The present invention is also directed to the use of a heterophasic polypropylene composition (HECO1) as described above in a composition comprising in addition to said heterophasic polypropylene composition (HECO1) a polyolefin (PO) and optionally an inorganic filler (F) to reduce flow marks of injection moulded articles made from said composition, with the proviso that the polyolefin is not the heterophasic polypropylene composition (HECO1).

Regarding the polyolefin (PO) and the inorganic filler (F), reference is made to the definition provided above.

The reduction of tigerskin is preferably accomplished in case of MSE values equal or below 30, more preferably in the range of 1 to 20, yet more preferably in the range of 1 to 7.

The present invention will now be described in further detail by the examples provided below.

EXAMPLES

1. Measuring Methods

The following definitions of terms and determination methods apply for the above general description of the invention as well as to the below examples unless otherwise defined.

Calculation of comonomer content of the first elastomeric propylene copolymer fraction, i.e. the polymer fraction produced in the third reactor (R3), of the heterophasic propylene copolymer (HECO1):

$$\frac{C(PP) - w(PP12) \times C(PP12)}{w(PP3)} = C(PP3)$$

wherein
w(PP12) is the weight fraction of the first and second propylene polymer fractions, i.e. the polymer produced in the first and second reactor (R1+R2),
w(PP3) is the weight fraction of the first elastomeric propylene copolymer fraction, i.e. the polymer produced in the third reactor (R3),
C(PP12) is the comonomer content [in mol-%] of the first and second propylene polymer fractions, i.e. the polymer produced in the first and second reactor (R1+R2),
C(PP) is the comonomer content [in mol-%] of the first and second propylene polymer fractions and the first elastomeric propylene copolymer fraction, i.e. the polymer produced in the first, second and third reactor (R1+R2+R3),
C(PP3) is the calculated comonomer content [in mol-%] of the first elastomeric propylene copolymer fraction, i.e. the polymer produced in the third reactor (R3).

Calculation of comonomer content of the second elastomeric propylene copolymer fraction, i.e. the polymer fraction produced in the fourth reactor (R4), of the heterophasic propylene copolymer (HECO1):

$$\frac{C(PP) - w(PP123) \times C(PP123)}{w(PP4)} = C(PP4)$$

wherein
w(PP123) is the weight fraction] of the first and second propylene polymer fractions and the first elastomeric propylene copolymer fraction, i.e. the polymer produced in the first, second and third reactor (R1+R2+R3),
w(PP4) is the weight fraction of second elastomeric propylene copolymer fraction, i.e. the polymer produced in the fourth reactor (R4),
C(PP123) is the comonomer content [in mol-%] of the first and second propylene polymer fractions and the first elastomeric propylene copolymer fraction, i.e. the polymer produced in the first, second and third reactor (R1+R2+R3),
C(PP) is the comonomer content [in mol-%] of the first and second propylene polymer fractions and the first and second elastomeric propylene copolymer fractions, i.e. the polymer produced in the first, second, third and fourth reactor (R1+R2+R3),
C(PP4) is the calculated comonomer content [in mol-%] of the second elastomeric propylene copolymer fraction, i.e. the polymer produced in the fourth reactor (R4).

Calculation of the xylene cold soluble (XCS) content of the elastomeric propylene copolymer fraction, i.e. the polymer fraction produced in the third and fourth reactor (R3+R4), of the heterophasic propylene copolymer (HECO1):

$$\frac{XS(HECO) - w(PP12) \times XS(PP12)}{w(E)} = XS(E)$$

wherein
w(PP12) is the weight fraction of the first and second propylene polymer fractions, i.e. the polymer produced in the first and second reactor (R1+R2),
w(E) is the weight fraction of the elastomeric propylene copolymer fraction, i.e. the polymer produced in the third and fourth reactor (R3+R4)
XS(PP12) is the xylene cold soluble (XCS) content [in wt.-%] of the first and second propylene polymer fractions, i.e. the polymer produced in the first and second reactor (R1+R2),
XS(HECO) is the xylene cold soluble (XCS) content [in wt.-%] of the first and second propylene polymer fractions and the elastomeric propylene copolymer fraction, i.e. polymer produced in the first, second, third and fourth (R1+R2+R3+R4),
XS(E) is the calculated xylene cold soluble (XCS) content [in wt.-%] of the elastomeric propylene copolymer fraction, i.e. the polymer produced in the third and fourth reactor (R3+R4).

Calculation of the xylene cold soluble (XCS) content of the first elastomeric propylene copolymer fraction, i.e. the polymer fraction produced in the third reactor (R3), of the heterophasic propylene copolymer (HECO1):

$$\frac{XS(PP) - w(PP12) \times XS(PP12)}{w(PP3)} = XS(PP3)$$

wherein
w(PP12) is the weight fraction of the first and second propylene polymer fractions, i.e. the polymer produced in the first and second reactor (R1+R2),
w(PP3) is the weight fraction of the first elastomeric propylene copolymer fraction, i.e. the polymer produced in the third reactor (R3)
XS(PP12) is the xylene cold soluble (XCS) content [in wt.-%] of the first and second elastomeric propylene polymer fractions, i.e. the polymer produced in the first and second reactor (R1+R2),
XS(PP) is the xylene cold soluble (XCS) content [in wt.-%] of the first and second propylene polymer fraction and the first elastomeric propylene copolymer fraction, i.e. polymer produced in the first, second and third reactor (R1+R2+R3),
XS(PP3) is the calculated xylene cold soluble (XCS) content [in wt.-%] of the first elastomeric propylene copolymer fraction, i.e. the polymer produced in the third reactor (R3).

Calculation of the xylene cold soluble (XCS) content of the second elastomeric propylene copolymer fraction, i.e. the polymer fraction produced in the fourth reactor (R4), of the heterophasic propylene copolymer (HECO1):

$$\frac{XS(PP) - w(PP123) \times XS(PP123)}{w(PP4)} = XS(PP4)$$

wherein
w(PP123) is the weight fraction of the first and second propylene polymer fractions and the first elastomeric propylene copolymer fraction, i.e. the polymer produced in the first, second and third reactor (R1+R2+R3),
w(PP4) is the weight fraction of the second propylene copolymer fraction, i.e. the polymer produced in the fourth reactor (R4)
XS(PP123) is the xylene cold soluble (XCS) content [in wt.-%] of the first and second propylene polymer fractions and the first elastomeric propylene copolymer fraction, i.e. the polymer produced in the first, second and third reactor (R1+R2+R3),
XS(PP) is the xylene cold soluble (XCS) content [in wt.-%] of the first and second propylene polymer fractions and the first and second elastomeric propylene copolymer fractions, i.e. polymer produced in the first, second reactor and third reactor (R1+R2+R3+R4),
XS(PP4) is the calculated xylene cold soluble (XCS) content [in wt.-%] of the second elastomeric propylene copolymer fraction, i.e. the polymer produced in the fourth reactor (R4).

Calculation of melt flow rate MFR$_2$ (230° C.) of the second propylene polymer fraction, i.e. the polymer fraction produced in the second reactor (R2), of the heterophasic propylene copolymer (HECO1):

$$MFR(PP2) = 10^{\left[\frac{\log(MFR(PP)) - w(PP1) \times \log(MFR(PP1))}{w(PP2)}\right]}$$

wherein
w(PP1) is the weight fraction of the first propylene polymer fraction, i.e. the polymer produced in the first reactor (R1),
w(PP2) is the weight fraction of the first second propylene polymer fraction, i.e. the polymer produced in the second reactor (R2),
MFR(PP1) is the melt flow rate MFR$_2$ (230° C.) [in g/10 min] of the first propylene polymer fraction, i.e. the polymer produced in the first reactor (R1),
MFR(PP) is the melt flow rate MFR$_2$ (230° C.) [in g/10 min] of the first and second propylene polymer fractions, i.e. the polymer produced in the first and second reactor (R1+R2),
MFR(PP2) is the calculated melt flow rate MFR$_2$ (230° C.) [in g/10 min] of the first propylene polymer fraction, i.e. the polymer produced in the second reactor (R2).

Calculation of the intrinsic viscosity of the xylene soluble fraction of the first elastomeric propylene copolymer fraction, i.e. the polymer fraction produced in the third reactor (R3), of the heterophasic propylene copolymer (HECO):

$$\frac{IV(PP) - \frac{XCS(PP12)}{100} \times IV(PP12)}{\frac{XCS(PP3)}{100}} = IV(PP3)$$

wherein
XCS(PP12) is the xylene soluble fraction [in wt.-%] of the first and second propylene polymer fractions, i.e. the polymer produced in the first and second reactor (R1+R2),
XCS(PP3) is the xylene soluble fraction [in wt.-%] of the first elastomeric propylene copolymer fraction, i.e. the polymer produced in the third reactor (R3),
IV(PP12) is the intrinsic viscosity [in dl/g] of the xylene soluble fraction of the first and second propylene polymer fractions, i.e. the polymer produced in the first and second reactor (R1+R2),
IV(PP) is the intrinsic viscosity [in dl/g] of the xylene soluble fraction of the first and second propylene polymer fractions and the first elastomeric propylene copolymer fraction, i.e. polymer produced in the first, second and third reactor (R1+R2+R3),
IV(PP3) is the calculated intrinsic viscosity [in dl/g] of the xylene soluble fraction of the first elastomeric propylene copolymer fraction, i.e. the polymer produced in the third reactor (R3).

Calculation of the intrinsic viscosity of the xylene soluble fraction of the second elastomeric propylene copolymer fraction, i.e. the polymer produced in the fourth reactor (R4), of the heterophasic propylene copolymer (HECO1):

$$\frac{IV(PP) - \frac{XCS(PP123)}{100} \times IV(PP123)}{\frac{XCS(PP4)}{100}} = IV(PP4)$$

wherein

XCS(PP123) is the xylene soluble fraction [in wt.-%] of the first and second propylene polymer fractions and the first elastomeric propylene copolymer fraction, i.e. the polymer produced in the first, second and third reactor (R1+R2+R3), XCS(PP4) is the xylene soluble fraction [in wt.-%] of second elastomeric propylene copolymer fraction, i.e. the polymer produced in the fourth reactor (R4), IV(PP123) is the intrinsic viscosity [in dl/g] of the xylene soluble fraction of the first and second propylene polymer fractions and the first elastomeric propylene copolymer fraction, i.e. the polymer produced in the first, second and third reactor (R1+R2+R3), IV(PP) is the intrinsic viscosity [in dl/g] of the xylene soluble fraction of the first and second propylene polymer fractions and the first and second elastomeric propylene copolymer fractions, i.e. polymer produced in the first, second, third and fourth reactor (R1+R2+R3+R4), IV(PP4) is the calculated intrinsic viscosity [in dug] of the xylene soluble fraction of the second elastomeric propylene copolymer fraction, i.e. the polymer produced in the fourth reactor (R4).

Calculation of comonomer content of the elastomeric propylene copolymer fraction, i.e. the polymer fraction produced in the third and fourth reactor (R3+R4), of the heterophasic propylene copolymer (HECO1):

$$\frac{C(HECO) - w(PP12) \times C(PP12)}{w(E)} = C(E)$$

wherein w(PP12) is the weight fraction of the first and second propylene polymer fractions, i.e. the polymer produced in the first and second reactor (R1+R2), w(E) is the weight fraction of the elastomeric propylene copolymer fraction, i.e. the polymer produced in the third and fourth reactor (R3+R4)

C(PP12) is the comonomer content [in mol-%] of the first and second propylene polymer fractions, i.e. the polymer produced in the first and second reactor (R1+R2), C(HECO) is the comonomer content [in mol-%] of the first and second propylene polymer fractions and the elastomeric propylene copolymer, i.e. polymer produced in the first, second, third and fourth (R1+R2+R3+R4), C(E) is the calculated comonomer content [in mol-%] of the elastomeric propylene copolymer fraction, i.e. the polymer produced in the third and fourth reactor (R3+R4).

$MFR_2$ (230° C.) is measured according to ISO 1133 (230° C., 2.16 kg load).

Determination of Comonomer Content

Quantitative infrared (IR) spectroscopy was used to quantify the ethylene content of the poly(ethylene-co-propene) copolymers through calibration to a primary method. Calibration was facilitated through the use of a set of in-house non-commercial calibration standards of known ethylene contents determined by quantitative $^{13}C$ solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method. Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 $cm^{-1}$, an aperture of 6 mm, a spectral resolution of 2 $cm^{-1}$, 16 background scans, 16 spectrum scans, an interferogram zero filling factor of 64 and Blackmann-Harris 3-term apodisation. Quantitative analysis was undertaken using the total area of the $CH_2$ rocking deformations at 730 and 720 $cm^{-1}$ ($A_Q$) corresponding to $(CH_2)_{>2}$ structural units (integration method G, limits 762 and 694 $cm^{-1}$). The quantitative band was normalised to the area of the CH band at 4323 $cm^{-1}$ ($A_R$) corresponding to CH structural units (integration method G, limits 4650, 4007 $cm^{-1}$). The ethylene content in units of weight percent was then predicted from the normalised absorption ($A_Q/A_R$) using a quadratic calibration curve. The calibration curve having previously been constructed by ordinary least squares (OLS) regression of the normalised absorptions and primary comonomer contents measured on the calibration set. Quantitative $^{13}C$ {$^1H$} NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C$ {$^1H$} NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer: fE=(E/(P+E) The comonomer fraction was quantified using the method of Wang et. al. (Wang, W-J., Zhu, S., Macromolecules 33 (2000), 1157) through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to $$E=0.5(S\beta\beta+S\beta\gamma+S\beta\delta+0.5(S\alpha\beta+S\alpha\gamma))$$

Through the use of this set of sites the corresponding integral equation becomes $$E=0.5(I_H+I_G\pm0.5(I_C+I_D))$$

using the same notation used in the article of Wang et. al. (Wang, W-J., Zhu, S., Macromolecules 33 (2000), 1157). Equations used for absolute propylene content were not modified. The mole percent comonomer incorporation was calculated from the mole fraction: E [mol %]=100*fE. The weight percent comonomer incorporation was calculated from the mole fraction: E [wt %]=100*(fE*28.06)/((fE*28.06)+((1-fE)*42.08))

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μL. of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

Flexural Modulus was measured according to ISO 178 using injection molded test specimen as described in EN ISO 1873-2 with dimensions of 80×10×4 mm³ at 23° C. at least 96 h after demoulding. Crosshead speed was 2 mm/min for determining the flexural modulus.

Charpy Notched Impact Strength (CNIS) is measured according to ISO 179-1/1 eA/DIN 53453 at 23° C. and −20° C., using injection molded bar test specimens of 80×10×4 mm³ prepared in accordance with ISO 294-1:1996.

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:
1. Image recording:
   The basic principle of the measurement system is to illuminate the plates with a defined light source (LED) in a closed environment and to record an image with a CCD-camera system. A schematic setup is given in FIG. 1.
2. Image Analysis:
   The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 440×148×2.8 mm with grain VW K50 and a Hot_I gate of 2.8 mm were used. The plaques were produced with filling time of 1.5 sec (filling rate 300 mm/sec).

Further Conditions:
Melt temperature: 240° C.
Mould temperature 30° C.
Dynamic pressure: 10 bar hydraulic The smaller the MSE value is at a certain filling time, the smaller is the tendency for flow marks.

2. Examples

A. Preparation of the Heterophasic Polypropylene Composition (HECO1) Preparation of the Catalyst
Used Chemicals:
20% solution in toluene of butyl ethyl magnesium (Mg(Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
TiCl₄, provided by Millenium Chemicals
Toluene, provided by Aspokem
Viscoplex® 1-254, provided by Evonik
Heptane, provided by Chevron
Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCL and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

VCH Modification of the Catalyst 35 ml of mineral oil (Paraffinum Liquidum PL68) was added to a 125 ml stainless steel reactor followed by 1.139 g of triethyl aluminium (TEAL) and 0.985 g of dicyclopentyl dimethoxy silane (donor D) under inert conditions at room temperature. After 10 minutes 5.0 g of the catalyst prepared as described above (Ti content 4.14 wt %) was added and after additionally 20 minutes 5.0 g of vinylcyclohexane (VCH) was added. The temperature was increased to 60° C. within 30 minutes and was kept at 60° C. for 20 hours. Finally, the temperature was decreased to 20° C. and the concentration of unreacted VCH in the oil/catalyst mixture was analysed and was found to be 700 ppm weight.

Preparation of the Heterophasic Polypropylene Compositions (HECO1)

The heterophasic polypropylene compositions (HECO1) were prepared in a sequential process comprising a loop (bulk) reactor and two or three gas phase reactors. The reaction conditions are summarized in Tables 1 and 2.

TABLE 1

Preparation and properties of the comparative and inventive heterophasic polypropylenes (HECO1)

| HECO1 Prepoly | | HECO1a | HECO1b | HECO1c | HECO1d |
|---|---|---|---|---|---|
| TEAL/Ti | [mol/mol] | 250 | 250 | 250 | 250 |
| TEAL/donor | [mol/mol] | 10 | 10 | 10 | 10 |
| Temperature Loop (Bulk) (R1) | [° C.] | 30 | 30 | 30 | 30 |
| Temperature | [° C.] | 80 | 80 | 80 | 80 |
| MFR | [g/10 min] | 140 | 550 | 550 | 400 |
| Split | [%] | 44 | 43 | 54 | 52 |
| $1^{st}$ GPR (R2) | | | | | |
| Temperature | [° C.] | 80 | — | — | 80 |
| Pressure | [kPa] | 2600 | — | — | 2600 |
| MFR GPR1 calc | [g/10 min] | 14 | — | — | 0.01 |
| MFR GPR1 final | [g/10 min] | 55 | — | — | 250 |
| Split | [%] | 29 | — | — | 2 |
| $2^{nd}$ GPR (R3) | | | | | |
| Temperature | [° C.] | 80 | 80 | 80 | 80 |
| C2 (XCS) | [mol %] | 37.9 | 23.8 | 51.0 | 51.0 |
| IV (XCS) | [dl/g] | 6.7 | 7.7 | 9.3 | 8.8 |
| Split | [%] | 17 | 57 | 46 | 46 |
| $3^{rd}$ GPR (R4) | | | | | |
| Temperature | [° C.] | 80 | — | — | — |
| C2 (XCS) calc | [mol %] | 37.9 | — | — | — |
| IV (XCS) calc | [dl/g] | 6.7 | — | — | — |
| Split | [%] | 10 | — | — | — |
| MFR final | [g/10 min] | 6.30 | 0.25 | 3.15 | 2.34 |
| XCS final | [wt %] | 22.0 | 33.2 | 32.2 | 33.4 |
| C2 (XCS) final | [mol %] | 37.9 | 23.7 | 51.0 | 51.0 |
| IV (XCS) final | [dl/g] | 6.7 | 7.7 | 9.3 | 8.8 |
| Flexural Modulus | [MPa] | 1030 | 742 | 699 | 699 |
| Charpy NIS +23° C. | [kJ/m²] | 45 | 89 | 70 | 70 |
| Charpy NIS -20° C. | [kJ/m²] | 6.3 | 2.6 | 15.1 | 15.1 |

TABLE 2

Preparation and properties of the comparative and inventive heterophasic polypropylenes (HECO1)

| HECO1 Prepoly | | HECO1e | HECO1f | HECO1g |
|---|---|---|---|---|
| TEAL/Ti | [mol/mol] | 250 | 250 | 250 |
| TEAL/donor | [mol/mol] | 10 | 10 | 10 |
| Temperature Loop (Bulk) (R1) | [° C.] | 30 | 30 | 30 |
| Temperature | [° C.] | 80 | 80 | 80 |
| MFR | [g/10 min] | 400 | 550 | 550 |
| Split | [%] | 51 | 53 | 53 |
| $1^{st}$ GPR (R2) | | | | |
| Temperature | [° C.] | 80 | 80 | 80 |
| Pressure | [kPa] | 2600 | 2600 | 2600 |
| MFR GPR1 calc | [g/10 min] | 0.01 | 0.01 | 0.01 |
| MFR GPR1 final | [g/10 min] | 250 | 350 | 350 |
| Split | [%] | 2 | 2 | 2 |
| $2^{nd}$ GPR (R3) | | | | |
| Temperature | [° C.] | 80 | 80 | 80 |
| C2 (XCS) | [mol %] | 33.3 | 27.3 | 27.3 |
| IV (XCS) | [dl/g] | 8.1 | 7.7 | 7.7 |
| Split | [%] | 23 | 30 | 16 |
| $3^{rd}$ GPR (R4) | | | | |
| Temperature | [° C.] | 80 | 80 | 80 |
| C2 (XCS) calc | [mol %] | 60.0 | 69.2 | 69.2 |
| IV (XCS) calc | [dl/g] | 9.8 | 10.5 | 10.5 |
| Split | [%] | 24 | 15 | 29 |
| MFR final | [g/10 min] | 1.64 | 1.64 | 1.58 |
| XCS final | [wt %] | 36.4 | 28.6 | 28.6 |
| C2 (XCS) final | [mol %] | 48.0 | 42.4 | 46.7 |
| IV (XCS) final | [dl/g] | 8.9 | 9.5 | 8.1 |
| Flexural Modulus | [MPa] | 705 | 714 | 689 |
| Charpy NIS +23° C. | [kJ/m²] | 73 | 77 | 66 |
| Charpy NIS -20° C. | [kJ/m²] | 13.6 | 10.8 | 18.1 |

The heterophasic polypropylene compositions (HECO1) were pelletized on a co-rotating twin screw extruder with 0.2 wt.-% Irganox B225 by BASF and 0.05 wt.-% calcium stearate.

B. Preparation of the Polyolefin Composition (C)

Used Materials

HECO2 is the commercial heterophasic polypropylene E050 AE by *Borealis* having a melt flow rate of 11.0 g/10 min, an ethylene content of 18.3 mol-%, a xylene soluble fraction (XCS) of 32.0 wt.-%, an ethylene content of the xylene soluble fraction (XCS) of 47.9 mol-% and an intrinsic viscosity (IV) of the xylene soluble fraction (XCS) of 2.5 dl/g.

Talc is the commercial Talc Steamic T1 CA of Imerys.

Example CE1 (comparative)

15.0 wt.-% of HECO1a, 15.0 wt.-% of Talc and balance of HECO2 were melt blended on a co-rotating twin screw extruder. The polymer melt mixture was discharged and pelletized.

Examples CE2, CE3 (Comparative) and IE1 to IE4 (Inventive)

13.5 wt.-% of the respective HECO1, 13.0 wt.-% of Talc and balance of HECO2 were melt blended on a co-rotating twin screw extruder. The polymer melt mixture was discharged and pelletized.

The properties of the comparative and inventive compositions are summarized in Table 3.

TABLE 3

Properties of the comparative and inventive compositions

|     | HECO1  | MFR [g/10 min] | Flexural Modulus [MPa] | Charpy NIS +23° C. [kJ/m$^2$] | Charpy NIS −20° C. [kJ/m$^2$] | MSE 1.5 s [−] |
|-----|--------|----------------|------------------------|-------------------------------|-------------------------------|----------------|
| CE1 | HECO1a | 9.5            | 1728                   | 41.2                          | 6.5                           | 10.0           |
| CE2 | HECO1b | 6.9            | 1688                   | 35.0                          | 5.1                           | 6.3            |
| CE3 | HECO1c | 9.4            | 1618                   | 48.0                          | 8.0                           | 8.4            |
| IE1 | HECO1d | 9.0            | 1618                   | 48.0                          | 8.0                           | 5.8            |
| IE2 | HECO1e | 8.3            | 1626                   | 46.0                          | 7.6                           | 4.6            |
| IE3 | HECO1f | 8.3            | 1642                   | 43.0                          | 7.0                           | 4.2            |
| IE4 | HECO1g | 8.5            | 1601                   | 51.0                          | 8.6                           | 5.8            |

The invention claimed is:

1. A heterophasic polypropylene composition (HECO1), comprising:
   i) a matrix (M) comprising a first propylene polymer (PP1) and a second propylene polymer (PP2), and
   ii) an elastomeric propylene copolymer (EPR) being a copolymer of propylene and ethylene and/or a $C_4$ to $C_8$ α-olefin dispersed within the matrix (M),
   wherein the ratio MFR(PP1)/MFR(PP2) is above 10,000, wherein MFR(PP1) is the melt flow rate MFR (230° C., 2.16 kg) in [g/10 min] determined according to ISO 1133 of the first propylene polymer (PP1) and MFR (PP2) is the melt flow rate MFR (230° C., 2.16 kg) in [g/10 min] determined according to ISO 1133 of the second propylene polymer (PP2).

2. The heterophasic polypropylene composition (HECO1) according to claim 1, wherein the second propylene polymer (PP2) has a melt flow rate MFR (230° C., 2.16 kg) determined according to ISO 1133 equal or below 10.0 g/10 min.

3. A heterophasic polypropylene composition (HECO1), comprising:
   i) a matrix (M) comprising a first propylene polymer (PP1) and a second propylene polymer (PP2), wherein the second propylene copolymer has a melt flow rate MFR (230° C., 2.16 kg) determined according to ISO 1133 of equal or below 0.05 g/10 min, and
   ii) an elastomeric propylene copolymer (EPR) dispersed within the matrix (M),
   wherein the ratio MFR(PP1)/MFR(PP2) is above 61, wherein MFR(PP1) is the melt flow rate MFR (230° C., 2.16 kg) in [g/10 min] determined according to ISO 1133 of the first propylene polymer (PP1) and MFR (PP2) is the melt flow rate MFR (230° C., 2.16 kg) in [g/10 min] determined according to ISO 1133 of the second propylene polymer (PP2).

4. The heterophasic polypropylene composition (HECO1) according to claim 1, wherein the first propylene polymer (PP1) has a melt flow rate MFR (230° C., 2.16 kg) determined according to ISO 1133 equal or above 100 g/10 min.

5. The heterophasic polypropylene composition (HECO1) according to claim 1, wherein the matrix (M) comprises the first propylene polymer (PP1) and the second propylene polymer (PP2) in a weight ratio of 99:1 to 80:20.

6. The heterophasic polypropylene composition (HECO1) according to claim 1, having a xylene soluble fraction (XCS) in the range of 10.0 to 50.0 wt. %.

7. The heterophasic polypropylene composition (HECO1) according to claim 6, wherein the comonomer content of the xylene soluble fraction (XCS) is in the range of 20.0 to 65.0 mol %.

8. The heterophasic polypropylene composition (HECO1) according to claim 1, comprising the matrix (M) and the elastomeric propylene copolymer (EPR) in a weight ratio of 70:30 to 30:70.

9. The heterophasic polypropylene composition (HECO1) according to claim 1, wherein the elastomeric propylene copolymer (EPR) comprises:
   i) a first elastomeric propylene copolymer (EPR1), and
   ii) a second elastomeric propylene copolymer (EPR2),
   wherein the ratio C(EPR2)/C(EPR1) is in the range of 1.1 to 10.0, wherein C(EPR2) is the comonomer content in [mol %] of the second elastomeric propylene copolymer (EPR2) and (EPR1) is the comonomer content in [mol %] of the first elastomeric propylene copolymer (EPR1).

10. The heterophasic polypropylene composition (HECO1) according to claim 1, having a melt flow rate MFR (230° C., 2.16 kg) determined according to ISO 1133 equal or below 10.0 g/10 min.

11. The heterophasic polypropylene composition (HECO1) according to claim 1, wherein said heterophasic polypropylene composition (HECO1)
   a) is free of phthalic acid esters as well as their respective decomposition products and
   b) has 2,1 regio defects of less than 0.4% determined by $^{13}$C-NMR spectroscopy.

12. A polyolefin composition (C), comprising:
   i) a polyolefin (PO),
   ii) the heterophasic polypropylene composition (HECO1) according to claim 1, and
   iii) optionally an inorganic filler (F).

13. The polyolefin composition (C) according to claim 12, comprising 5.0 to 30.0 wt. % of the heterophasic polypropylene composition (HECO1), based on the overall weight of the polyolefin composition (C).

14. A polyolefin composition (C) according to claim 12, wherein the polyolefin (PO) is a polypropylene being different than the heterophasic polypropylene composition (HECO1).

15. An injection moulded article, comprising the polyolefin composition (C) according to claim 14.

* * * * *